United States Patent
Banerjee et al.

(10) Patent No.: US 12,282,828 B2
(45) Date of Patent: Apr. 22, 2025

(54) METHODS AND APPARATUSES FOR DETERMINING OPTIMAL CONFIGURATION IN COGNITIVE AUTONOMOUS NETWORKS

(71) Applicant: NOKIA TECHNOLOGIES OY, Espoo (FI)

(72) Inventors: Anubhab Banerjee, Munich (DE); Stephen Mwanje, Dorfen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 950 days.

(21) Appl. No.: 17/377,662

(22) Filed: Jul. 16, 2021

(65) Prior Publication Data
US 2022/0027789 A1    Jan. 27, 2022

Related U.S. Application Data

(60) Provisional application No. 63/056,084, filed on Jul. 24, 2020.

(51) Int. Cl.
*G06N 20/00* (2019.01)
*G06F 9/445* (2018.01)

(52) U.S. Cl.
CPC ......... *G06N 20/00* (2019.01); *G06F 9/44505* (2013.01)

(58) Field of Classification Search
CPC . G06N 20/00; G06F 9/44505; H04L 41/0873; H04L 41/0886; H04L 41/0813; H04W 24/02
See application file for complete search history.

(56) References Cited

U.S. PATENT DOCUMENTS

| | | | |
|---|---|---|---|
| 7,590,589 B2* | 9/2009 | Hoffberg | G06Q 40/06 705/37 |
| 2009/0292793 A1* | 11/2009 | Jiang | H04L 41/0806 709/221 |
| 2014/0214741 A1* | 7/2014 | Chester | G06N 5/043 706/46 |
| 2017/0063621 A1* | 3/2017 | Sanneck | H04L 41/0886 |
| 2018/0019910 A1* | 1/2018 | Tsagkaris | H04W 24/02 |
| 2019/0273662 A1* | 9/2019 | Mwanje | H04W 24/02 |
| 2020/0096598 A1 | 3/2020 | Jadav et al. | |

FOREIGN PATENT DOCUMENTS

| | | | | |
|---|---|---|---|---|
| CN | 103548375 A | * | 1/2014 | ........ H04L 41/0823 |
| CN | 103796211 A | | 5/2014 | |
| CN | 104285470 A | * | 1/2015 | ........... H04W 24/02 |
| CN | 110024327 A | * | 7/2019 | ........ H04L 41/0823 |

(Continued)

OTHER PUBLICATIONS

S. Brânzei, Y. Chen, X. Deng, A. Filos-Ratsikas, S. Frederiksen, and J. Zhang, "The Fisher Market Game: Equilibrium and Welfare", AAAI, vol. 28, No. 1, Jun. 2014. (Year: 2014) (Year: 2014).*

(Continued)

*Primary Examiner* — Oluwatosin Alabi
*Assistant Examiner* — Jasmine Thanh Thai
(74) *Attorney, Agent, or Firm* — Robert P. Michal, Esq.; Carter, DeLuca & Farrell LLP

(57) ABSTRACT

Systems, methods, apparatuses, and computer program products for determining and/or applying optimal configurations in cognitive autonomous networks (CANs) are provided.

1 Claim, 6 Drawing Sheets

(56) References Cited

FOREIGN PATENT DOCUMENTS

| | | | | |
|---|---|---|---|---|
| EP | 3116256 | A1 * | 1/2017 | |
| GB | 2442042 | A * | 3/2008 | ............ H04W 28/18 |
| WO | WO-2012072445 | A1 * | 6/2012 | ......... H04L 41/0823 |
| WO | WO-2013185354 | A1 * | 12/2013 | ............ H04W 24/02 |
| WO | WO-2018042232 | A1 * | 3/2018 | ......... H04L 41/0823 |
| WO | WO 2015/233818 | | 12/2018 | |
| WO | WO-2018233818 | A1 * | 12/2018 | ........... H04L 41/022 |
| WO | WO-2019051798 | A1 * | 3/2019 | ............ H04W 28/16 |

OTHER PUBLICATIONS

S. S. Mwanje, H. Sanneck and A. Mitschele-Thiel, "Synchronized Cooperative Learning for Coordinating Cognitive Network Management Functions," in IEEE Transactions on Cognitive Communications and Networking, vol. 4, No. 2, pp. 244-256, Jun. 2018, doi: 10.1109/TCCN.2018.2805349. (Year: 2018).*

Partial European Search Report for European Application No. 21183841.2 dated Nov. 18, 2021, 14 pages.

Extended European Search Report for European Application No. 21183841.2 dated Feb. 18, 2022, 14 pages.

Mwanje et al., "Synchronized Cooperative Learning for Coordinating Cognitive Network Management Functions", IEEE Transactions on Cognitive Communications and Networking, vol. 4, No. 2, (Jun. 2018), 13 pages.

Mwanje et al., "Concurrent Cooperative Games for Coordinating SON Functions in Cognitive Cellular Networks", IFIP/IEEE IM 2015 Workshop: 1st Workshop on Cognitive Network & Service Management (CogMan), (Jul. 2, 2015), 6 pages.

Mwanje et al., "Environment Modeling and Abstraction of Network States for Cognitive Functions", NOMS 2020—2020 IEEE/IFIP Network Operations and Management Symposium, (Jun. 8, 2020), 8 pages.

Brainard et al., "How to Compute Equilibrium Prices in 1891", Cowles Foundation Discussion Paper No. 1272, Yale University, (Aug. 2000), 22 pages.

Brânzei et al, "The Fisher Market Game: Equilibrium and Welfare", Proceedings of the 28th Conference on Artificial Intelligence (AAAI), (Jul. 27-31, 2014), 7 pages.

Eisenberg et al, "Consensus of Subjective Probabilities: The Pari-Mutuel Method", Annals of Mathematical Statistics 30(1), (Mar. 1959), pp. 165-168.

Patent Cooperation Treaty Application No. PCT/EP2020/061183, filed Apr. 22, 2020; Entitled "A Coordination and Control Mechanism for Conflict Resolution for Network Automation Functions", 34 pages.

Shapley, L., "A Value for N-Person Games", The Rand Corporation, (Mar. 18, 1952), 15 pages.

Office Action received for corresponding Chinese Patent Application No. 202110836858.1, dated Aug. 23, 2023, 7 pages of office action and no page of translation available.

Fei et al., "Architecture of Cognitive Network Based on Cognitive Layer and Corresponding Cognitive Method", Journal of Beijing University of Technology, vol. 35, No. 9, 2009, pp. 1181-1187.

Feng et al., "Cognitive Wireless Mesh Networks", Journal of Information Engineering University, vol. 11, No. 4, 2010, pp. 429-433.

Notice of Allowance received for corresponding Chinese Patent Application No. 202110836858.1, dated Dec. 27, 2023, 4 pages of Notice of Allowance and no page of translation available.

Office Action received for corresponding European Patent Application No. 21183841.2, dated Mar. 18, 2024, 5 pages.

* cited by examiner

METHODS AND APPARATUSES FOR DETERMINING OPTIMAL CONFIGURATION IN COGNITIVE AUTONOMOUS NETWORKS

CROSS-REFERENCE TO RELATED APPLICATIONS

This application claims benefit to U.S. Provisional Application No. 63/056,084, filed Jul. 24, 2020, the entire contents of which are incorporated herein by reference.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for determining optimal configurations in cognitive autonomous networks (CANs).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

DETAILED DESCRIPTION

Figure 1:
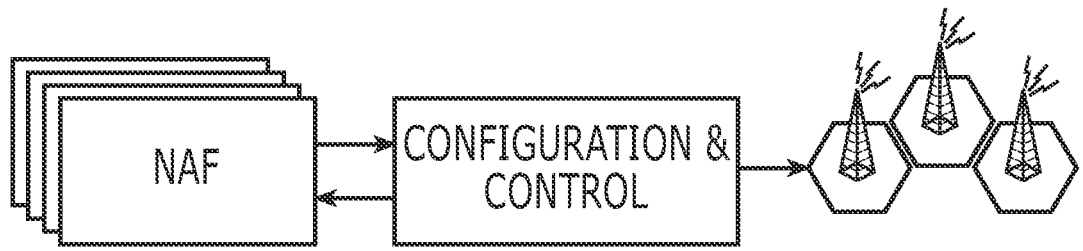
FIG. 1 illustrates an example diagram depicting the control and configuration management for streamlining access to and configuration of network resources, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for determining optimal configurations in cognitive autonomous networks (CANs), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain example embodiments may relate to the operation of network automation functions (NAFs) in 5G (radio access) networks and/or other future generations of wireless or mobile networks. Self organizing networks (SON) have been successful in introducing network automation to guarantee increased operational efficiency and related operational expenditure reductions through closed-loop-control-based SON functions (SFs). A SF is a network automation function (NAF) in a SON. For end-to-end system performance, the SFs may be complemented with rule-based SON coordination aimed to minimize conflicts among the SFs.

However, SON may be limited in at least two aspects. This includes that SFs cannot adapt themselves in a rapidly changing environment owing to their rule-based nature, and the existence of a large number of rules in individual SFs makes maintenance and upgrade of SON extremely difficult. Correspondingly, cognitive autonomous networks (CAN) are being considered to replace SON. In CANs, SFs are replaced with learning agents, which may be called cognitive functions (CFs), whose behavior is non-deterministic and based on their learning but not on predefined rules. Hence, a CF is a NAF in CAN. Therefore, as described herein, a CF may alternately be referred to as a learning agent or NAF, or the like.

The CAN may include several CFs which propose configurations. The CAN may also include a controller that can resolve or at least minimize conflicts among the CFs and may determine the optimal configurations (see FIG. 1). FIG. 1 illustrates an example diagram depicting the control and configuration management for streamlining access to and configuration of network resources. The CF(s), as a learning agent, may determine the optimal value(s) for a configuration according to its achieved objective in that configuration for a particular network state. The network configuration may either be used by a single CF or may be shared among multiple CFs. For example, when a configuration is used by a single CF, then just that single CF's learning may be accounted for in the determination of its optimal value.

Figure 2:
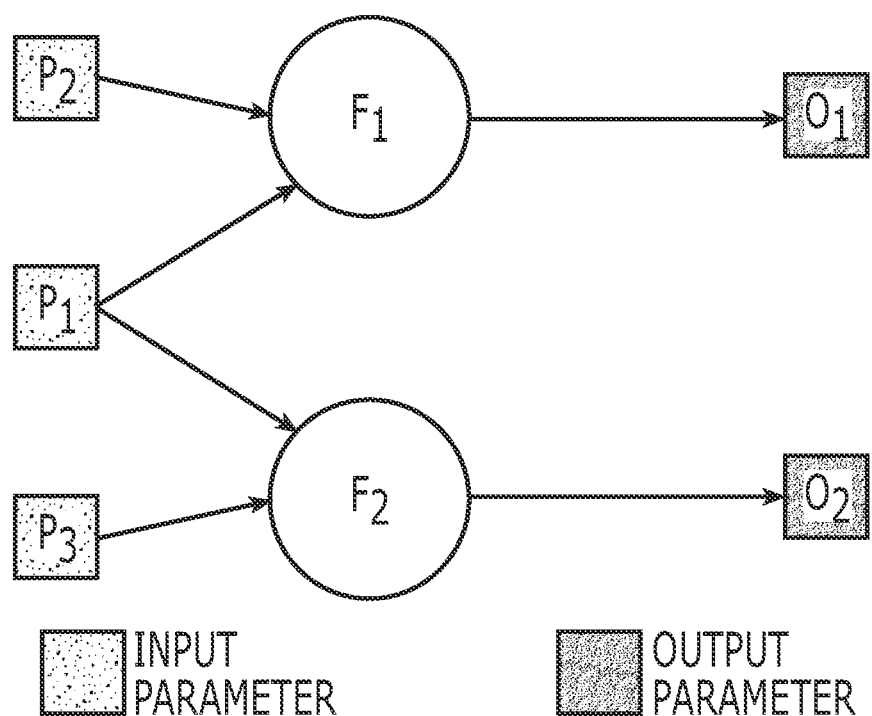
FIG. 2 illustrates an example of a cognitive autonomous network (CAN) system including cognitive functions (CFs), according to an embodiment.
Figure 3:
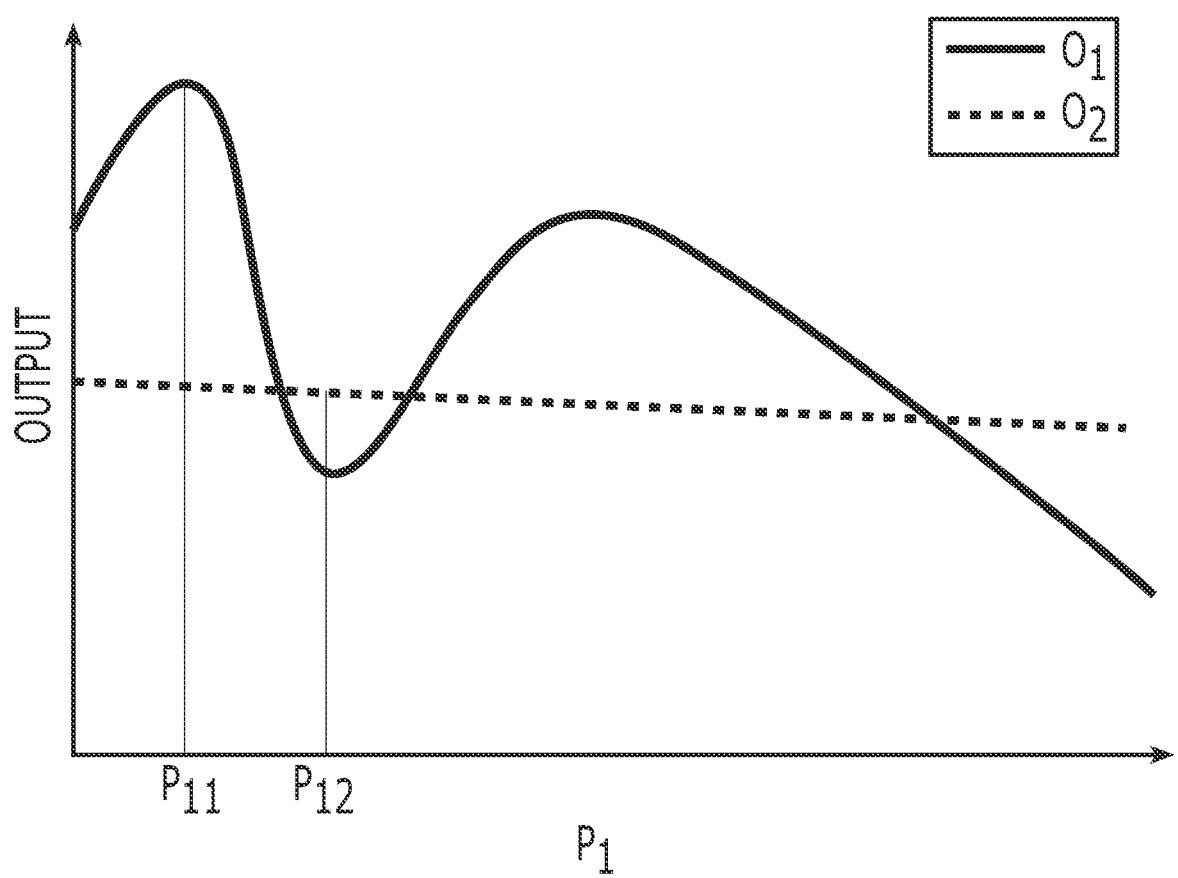
FIG. 3 illustrates an example graph depicting the output variations of the CFs depicted in FIG. 2, according to an embodiment.

However, there are also cases where CFs work in parallel with one another sharing the same resources (configurations) although with different levels of interests. FIG. 2 illustrates an example of a CAN system. While any number of CFs may be included, in the example of FIG. 2, the CAN system includes two CFs, $F_1$ and $F_2$, both of which share the same input parameter, $p_1$, in this example. The individual interest of the CFs on $p_1$ can be deduced from the dependence of their outputs of and $o_2$ on the value of $p_1$ as shown in the example of FIG. 3. More specifically, FIG. 3 illustrates an example graph depicting the output variations of the two CFs with respect to $p_1$. It is evident from the example of FIG. 3 that, when compared to $o_2$, $o_1$ significantly changes with changes in $p_1$. For instance, when $p_1$ changes from $p_{11}$ to $p_{12}$, $o_1$ decreases by a significant amount, yet $o_2$ remains almost constant. Thus, in this example, for $F_2$ it does not necessarily matter if $p_1$ is set at $p_{11}$ or $p_{12}$, but for $F_1$ it is more important as $o_1$ is maximum at $p_{11}$ and minimum at $p_{12}$. From this observation, it is evident that $p_1$ is more important to $F_1$ than $F_2$, or, to put it another way, $p_1$ has more weight (or, influence) in determining $o_1$ than in determining oz. With such differences in the level of interest in a given configuration, it may be desirable to provide means through which the optimal configuration can be determined in the presence of such variations in the levels of interest.

As introduced above, when a configuration is shared among multiple CFs, the corresponding value cannot be dictated by any one of the CFs. Instead, the final configuration should be communally acceptable according to at least the considerations discussed in the following. Each CF may generate a desired value of the configuration, which is optimal according to its own learning. However, since the configuration is shared among multiple CFs, a compromise value may be determined or calculated such that it is optimal for the combined interest of the multiple CFs. It may be found that different CFs have different levels of interest on any particular configuration (as illustrated by the example in FIGS. 2 and 3). Correspondingly, the determination of the compromise value may account for the individual interests of the CFs on that configuration. Since a CF may continuously be learning from their observations of the different network and environment states, as well as the CFs' responses thereto, a CF's optimal value for a particular configuration may change. Correspondingly, the configuration's optimal values cannot be calculated beforehand but are determined in a dynamic manner depending on the basis of need of the CFs. Since the methods used to determine or calculate the optimal values of different configurations are dynamic, the complexity of the system may become too high. Therefore, a single dynamic optimal configuration calculation approach may be desirable in CAN to determine the configuration values.

For the example in FIGS. 2 and 3, the corresponding controller may account for the difference in interest over $p_1$; otherwise resolving it with equal importance for the two functions $F_1$ and $F_2$ will result in unnecessary suboptimal performance for $F_1$ without any benefit for $F_2$. Additionally, the same method can apply for calculating optimal configurations for $p_1$, $p_2$, $p_3$, i.e., the optimal configuration calculation may be independent of the parameter or configuration.

An example embodiment may provide a controller for determining optimal or best possible configurations in CAN based on proposed configurations from multiple NAFs that have differentiated interests in the particular configuration. While determining a configuration, the controller may take into account individual interests of the CFs in that configuration. The controller may then combine those individual interests to compute the allocation of rights to determine the value of the eventual configuration.

According to an embodiment, an optimal configuration may refer to a value for the configuration that provides the best possible compromise when taking into account the interests of all the entities in a network. Therefore, in an embodiment, the optimal configuration is one whose value is best for the combined interest of the CFs involved in a CAN.

Figure 4:
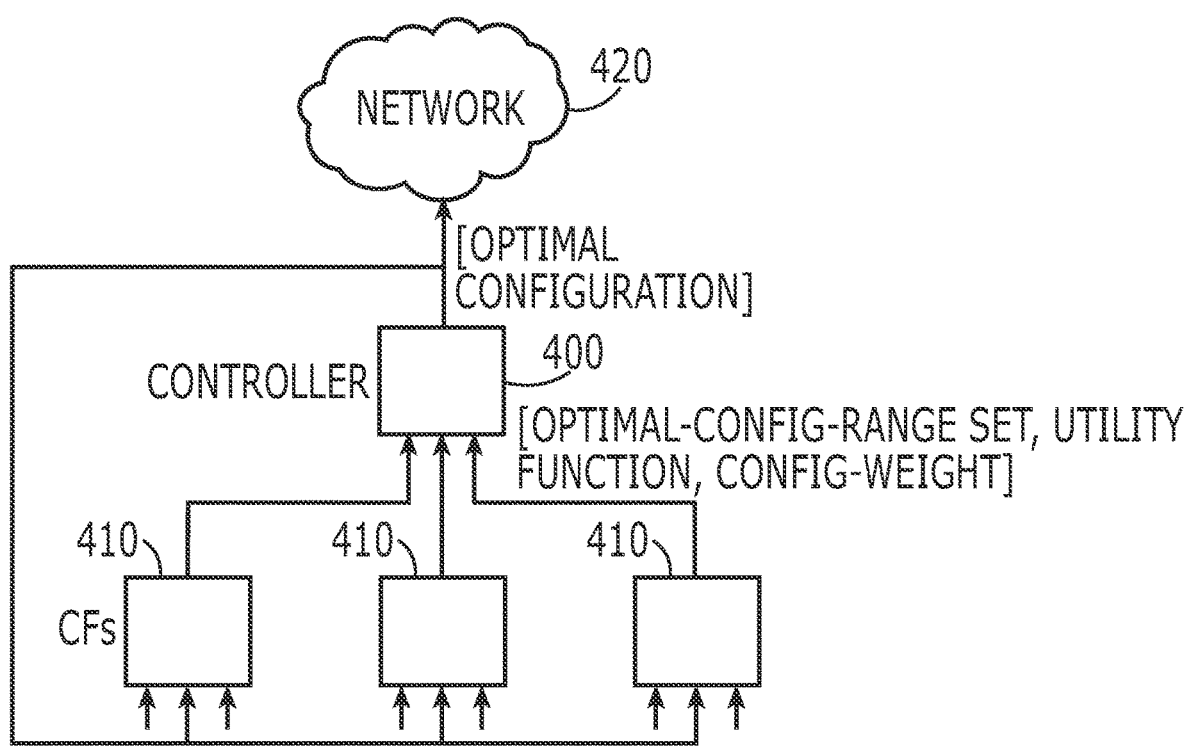
FIG. 4 illustrates an example diagram depicting the input-output of a controller for a CAN, according to an embodiment.

FIG. 4 illustrates an example diagram depicting the input-output of a controller 400, according to one example embodiment. According to an embodiment, the controller 400 may be a separate function from the CFs 410 and may be one layer above the CF in operational hierarchy. As such, the controller 400 may be seen as part of the operating environment for the CFs 410, as illustrated in the example of FIG. 4. As illustrated in the example of FIG. 4, and discussed in more detail below, the controller 400 may receive information from the CFs 410, may use the received information to determine or calculate an optimal value for the configuration across the CFs 410, and may provide the optimal configuration to the network 420.

According to certain embodiments, a controller may be characterized by the following. In one embodiment, the controller can be used to determine the optimal values for different configurations in CAN. In case of a configuration sharing among multiple CFs, each of the CFs, or some subset of the CFs, may provide the controller with at least three pieces of information. For example, the information may include an optimal-config-range set, a utility function, and config-weight. The optimal-config-range set may include a set of values for the configuration that is most favorable for the CF's objective. The utility function may map each configuration value to the utility the CF achieves using that value. The config-weight may provide the Controller an estimation about the importance of the configuration to the CF.

In an embodiment, based on the received information, the controller may determine or calculate the interest-weighted optimal value for the configuration. It is to be noted that, by applying certain embodiments, the determined configuration can be optimal for the combined interest of the CFs. For example, the calculated value for a configuration by the controller may be optimal for the combined interest of the system while taking individual interests into account for a given network state. While determining or calculating the optimal configuration, any existing conflict among the CFs can be automatically resolved by the controller.

According to certain embodiments, the output of the controller, which may include the optimal configuration, can be used to reconfigure the CFs and/or the network. In an embodiment, the controller may reconfigure the CFs so that they now use the optimal configuration for any future network control actions, or the controller may directly configure the network with the compromise, optimal configuration. As the optimal configuration calculation is dynamic, the controller can resolve any type of conflict among the CFs in any real life scenario.

As introduced above, a CF may send at least three pieces of information to the controller for a configuration transaction. For example, the information may include an optimal-config-range set, a utility function, and config-weight, as discussed in more detail below.

As each CF is a learning agent itself, a CF can generate its most favorable configuration set based on its learning. This set may be called the optimal configuration range set (optimal-config-range set). An optimal-config-range set may have the following structure: [$min_{config}$, $max_{config}$] where $min_{config}$ denotes the lower bound and $max_{config}$ denotes the upper bound of the set. For a configuration value which lies in between $min_{config}$ and $max_{config}$, the objective (output) of the CF may lie within a certain percentage (value of which can be decided by the network operator) of its maximum objective (output) value.

In CAN, different CFs may have different objectives with different dimensions. For the controller to understand and compare between different output values from different CFs, it may be desirable to convert the outputs in some identical predefined scale. This scale can be provided by the network operator or by the controller beforehand. An example of such a scale is [0:10], where 0 means the lowest and 10 means the highest achievable value by the CF. To convert its output to this scale, each CF may generate a function which is called utility function. A utility function can be denoted by $f(p)$, where p means the configuration value and corresponding to this p, $f(p)$ provides the utility of the CF in the predefined scale. An example of the utility function includes an action quality indicator (AQI).

In general, a CF may work on several input configurations to generate its objective. These input configurations may not have equal importance (weight) in determining its objective. This relative importance of the configurations on the output is referred to as the configuration weight (config-weight). For example, in FIG. 2, it is shown that $F_1$ has two input parameters $p_1$ and $p_2$. If it is assumed that $w_1$ and $w_2$ are their config-weights respectively, $w_1$ and $w_2$ may be calculated in such a way so that $w_1+w_2=1$, so that these $w_i$ values generated by different CFs for the same configuration can be expressed on the same scale and become comparable.

As provided according to certain embodiments, a CAN model may include a plurality of CFs and a controller. The CFs may be trained or configured offline with data generated from a simulator or with real life data. A purpose of training using a vast dataset is to identify the config-weights beforehand (a method for calculation of config-weight values is described below). The config-weight values may remain fixed during operational time, unless changed manually by a mobile network operator (MNO) or automatically by a higher-hierarchy function that supervises other CFs.

Figure 5:
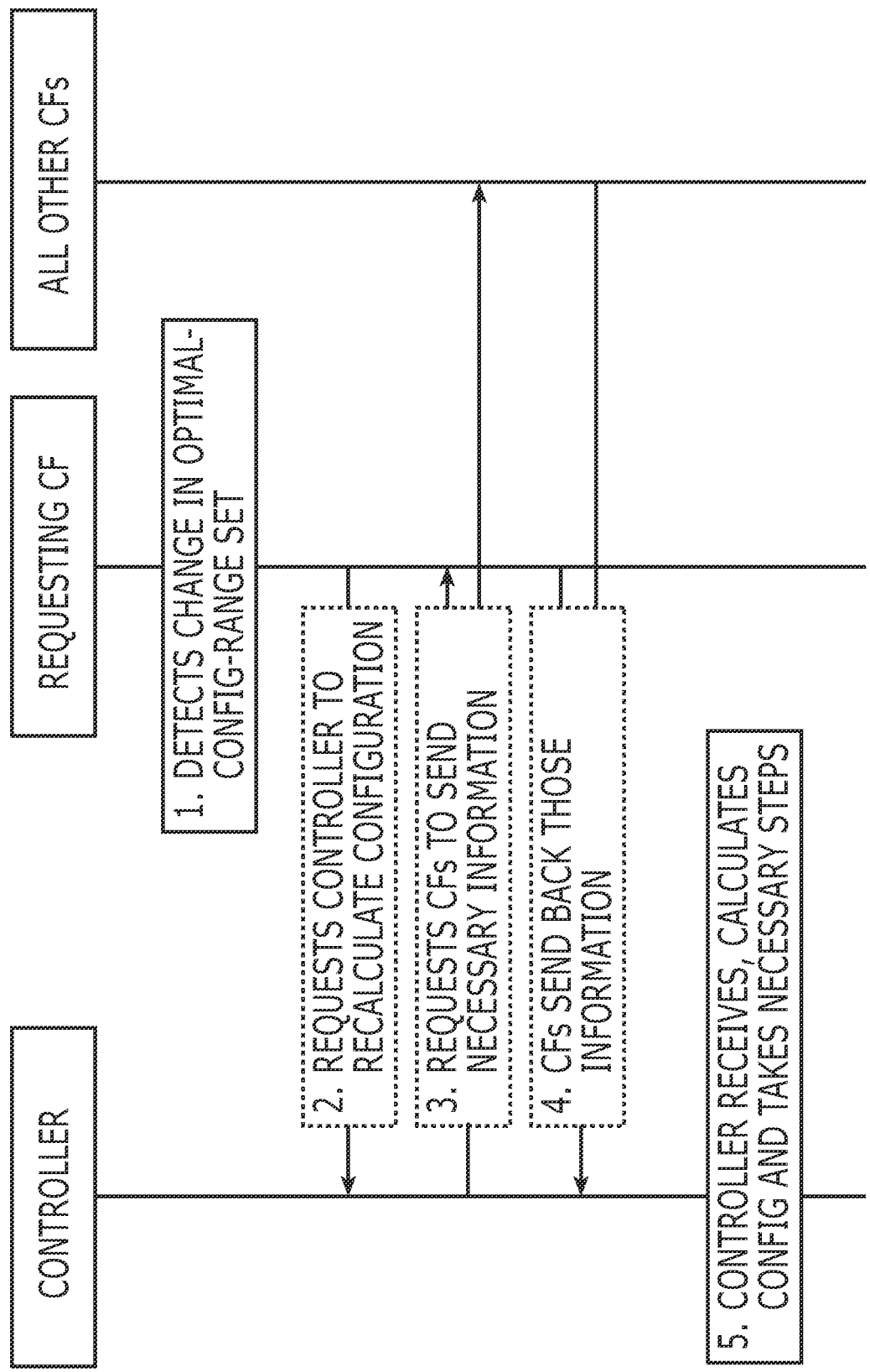
FIG. 5 illustrates an example signaling diagram, according to an embodiment.

FIG. 5 illustrates an example signaling diagram for a system including a controller, a requesting CF, and one or more other CFs, according to an embodiment. The system may start with some preloaded configurations. For example, these configurations may be set by the MNO manually from previous experience. The example of FIG. 5 depicts an end-to-end workflow of the system when the optimal value of a configuration is calculated, according to an embodiment.

In an embodiment, after the system becomes operational, the CF(s) may start observing its output and learning from it. After every certain time interval, a CF may calculate the optimal-config-range set for a configuration and can compare it with the optimal-config-range set calculated in the last cycle. If these two sets are identical, the CF does nothing and continues its learning and waits for the next cycle. If the two sets are not identical, as shown at 1 in the example of FIG. 5, then the CF detects a change in the optimal-config-range set. When such a change is detected, the procedure may include, at 2, transmitting a request to the controller to (re-)calculate the configuration.

Figure 6:
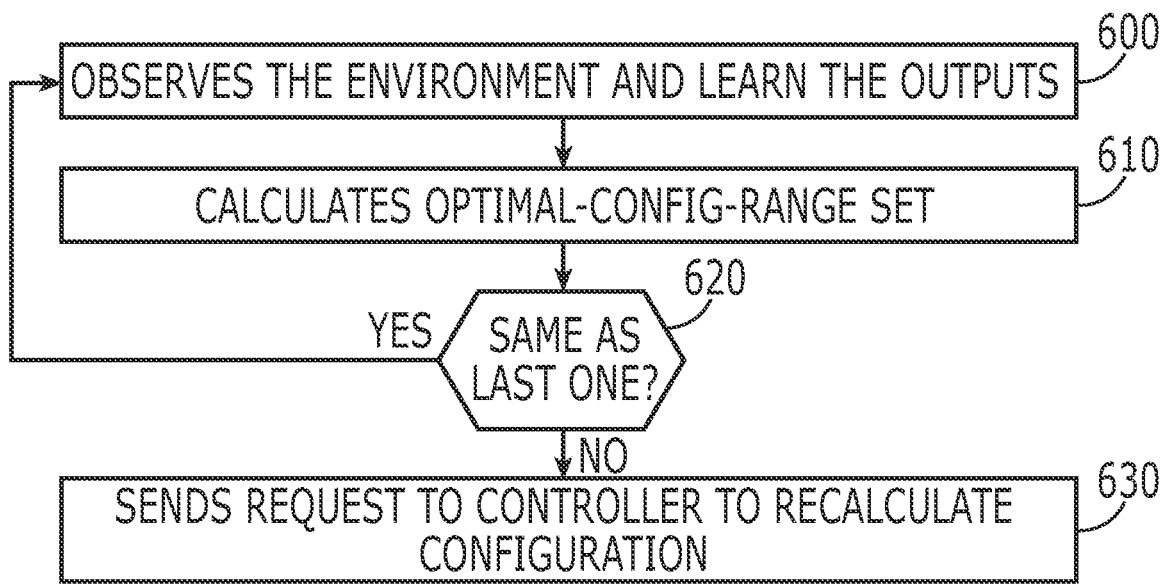
FIG. 6 illustrates an example flow diagram of a method, according to an embodiment.

FIG. 6 illustrates an example flow diagram of a method depicting how a CF may detect a change in the optimal-config-range set. As illustrated in the example of FIG. 6, at 600, the method may include the CF observing the environment and learning the outputs. At 610, the method may include calculating the optimal-config-range set and, at 620, may determine whether the calculated optimal-config-range set is the same as the previously calculated set. If it is the same, then the method may return to procedure 600. If the calculated optimal-config-range set is not the same as the previously calculated set, then the method may include, at 630, sending a request to the controller to recalculate the configuration.

Returning to the example of FIG. 5, after a CF detects a change in its optimal-config-range set, at 2, the CF sends a request to the controller to recalculate that configuration. In the example of FIG. 5, a CF which requests the controller for recalculation, is denoted as requesting CF. It is noted that there may be one or multiple Requesting CFs.

As further illustrated in the example of FIG. 5, after the controller receives a request for configuration recalculation from a CF, at 3, the controller sends a message to the CFs in the system (including the requesting CF), requesting them to send their (i) optimal-config-range set, (ii) utility function and (iii) config-weight values to the controller. At 4, after the CFs (requesting CF and rest of the CFs) receives the request from the controller, the CFs may recalculate the corresponding utility function and send the latest optimal-config-range set, utility function and config-weight to the controller.

As also illustrated in the example of FIG. 5, at 5, the controller may receive the requested information from the CFs and calculate the configuration. More specifically, the controller may receive the (i) optimal-config-range set, (ii) utility function and (iii) config-weight values from the CFs. Based on the received information, the controller may calculate the optimal configuration as discussed in more detail below. Then, the controller can make necessary changes and can reconfigure the network according to this newly calculated configuration value.

In general, there may be multiple input configurations to a CF. Each of these configurations may have different levels of impact on determining the final objective of the CF. The impact of each configuration on the output can be quantified by the config-weight value ($w_i$). Some embodiments provide a novel Shapley value based config-weight calculation method. In certain embodiments, these $w_i$ values can be calculated by different methods, two of them are discussed in the following.

According to one example method, the $w_i$ values can be set manually by the MNO based on previous knowledge. This method provides a fast and low complexity solution.

According to another example method, the config-weight values may be calculated using a Shapley value calculation. In a multi-player game with a single objective, Shapley value determines the marginal contribution of each player in that game. So, if a normal-form game on the functionality of a CF is provided where the input configurations of the CF are the players of the game, then the Shapley value for each input configuration provides the marginal contribution of that configuration in the objective of the CF—which may be considered the same as the config-weight value. Using this approach, the probability of error in the $w_i$ values is zero and calculated configuration is optimal.

According to an embodiment for config-weight (or, Shapley value) calculation, it may be assumed that there are four input configurations to a CF ($p_1$, $p_2$, $p_3$, $p_4$), and from its learning experience, the CF already knows $p_1'$, $p_2'$, $p_3'$, $p_4'$ for which its output is maximum ($o_{max}$). P is the set of all players P={$p_1$, $p_2$, $p_3$, $p_4$}. A coalition among input configurations is formed by taking any combination of them. N is the set of all possible coalitions N={{Ø}, {$p_1$}, {$p_2$}, {$p_3$}, {$p_4$}, {$p_1$, $p_2$}, {$p_1$, $p_3$}, {$p_1$, $p_4$}, . . . ,}. A payoff is defined on a coalition. For example, if $S_1$ is a coalition $S_1$={$p_1$, $p_2$}, then maximum output is calculated when $p_1$, $p_2$ are varied and $p_3$=$p_3'$ and $p_4$=$p_4'$. If this output is called $o_{S1}$, then payoff of this coalition is $pf(S_1)$=$o_{S1}/o_{max}$. Then, the Shapley value for an input configuration ($\zeta_{pi}$) may be calculated using the following formula:

$$\zeta_i(pf) = \sum_{S \subseteq N, i \notin S} \frac{|S|!(|N|-1-|S|)!}{|N|!} \cdot [pf(S \cup \{i\}) - pf(S)]$$

According to an embodiment, to calculate the optimal configuration for the combined interest of the interested CFs while taking their individual interests into account, CAN may be modeled as a Fisher Market Model (FMM). A Fisher Market Model M comprises a set of buyers, denoted by D={$d_1$, $d_2$, . . . , $d_d$}, and a set of items, denoted by C={$c_1$, $c_2$, . . . , $c_c$}. A buyer $d_i$ has an initial budget ($b_i$) which can be visualized as money that can just be utilized to purchase the items and has no intrinsic value to the buyer, and a utility function $u_i$: $[0,1]^c \rightarrow R$, that maps a quantity vector of the c items to some real predefined scale, where $u_i(x_i)$ represents the buyer's utility when receiving $x_i$ amount of items. The set of budgets may be denoted as B={$b_1$, $b_2$, . . . , $b_d$}. Without loss of generality, the supply of each good is assumed to be one unit and the total budget of all buyers is normalized to one, i.e., $\Sigma b_i$=1. These assumptions are often made for convenience in analyzing the model without affecting the results.

When the FMM is used as a mechanism for allocating resources among self-interested agents, it induces a game called FMM game. An agent's utility in the game is their utility of the allocated items with respect to their true preference. In this game, an agent first reports its preference to some central entity and the central entity then determines a market equilibrium according to the budgets of the agents and their reported preferences on the items of C, i.e., based on the budget $b_i$ of a buyer $d_i$, it can be determined the items ($c_j$) the buyer should possess for an optimal allocation of items.

An embodiment can use the FMM game to calculate the optimal configuration in a CAN. In certain embodiments, the controller can be visualized as the central entity of the FMM game and CFs may be visualized as the buyers. As each configuration is calculated one by one, a new game is introduced for each configuration calculation. For example, while determining the optimal value of $p_1$, set of buyers are D={$F_1$, $F_2$} and set of items is C={$p_1$}. Then, the interest of each CF in determining the value of $p_1$ as their corresponding budgets may be visualized. An example of how the interest value of a CF on a particular configuration may be calculated was discussed above. As an example, if it is assumed that on $p_1$, $F_1$ has interest $w_1$ and $F_2$ has interest $w_2$, then the game model is complete with the following attributes: D={$F_1$, $F_2$}, C={$p_1$} and B={$w_1$, $w_2$}. The optimal allocation in an FMM game can be found by the following:

$$\max \Pi_i(u_i(x_i))^{bi}$$
$$\text{s.t. } x_{ij} \geq 0 \forall i[c], j[d]$$
$$\Sigma x_{ij} \leq 1 \forall j[d]$$

If this solution is compared with the provided game model—(i) $u_i(x_i)$ becomes $f_i(p_1)$, and, (ii) $b_i$ is similar to $w_i$, however, $b_i$ values are normalized ($\Sigma b_i$=1) whereas $w_i$ values are not. So, $w_1$ is mapped to $w_1'$ and $w_2$ is mapped to $w_2'$ such that $w_1'+w_2'$=1 and now $b_i$ becomes equivalent to $w_i'$. Then, the target of the controller is to find the particular $p_1$, from a set of all possible values, for which $f_1(p_1)^{w1'} \cdot f_2(p_1)^{w2'}$ is maximum. This particular value of $p_1$ is optimal for the combined interest of the CFs ($F_1$ and $F_2$) in the CAN system.

In the following, an example is provided for how a controller may calculate optimal configurations in CAN. An embodiment may use the CAN model shown in FIG. 1 discussed above, and optimal values of $p_1$, $p_2$ and $p_3$ can be calculated.

In an embodiment, before the system becomes operational, using data generated from a simulator, each CF may calculate the optimal-config-range sets and config-weights of its input configurations. For $F_1$, input parameters are $p_1$ and $p_2$, and output is $o_1$. It may be assumed that optimal-config-range set for $p_1$ is: $[p_1^{min,F1}, p_1^{max,F1}]$, p2 is: $[p_2^{min,F1}, p_2^{max,F1}]$ and config-weight of $p_1$ on $o_1$ is $w_{o1,p1}$ and $p_2$ on $o_1$ is $-w_{o1,p2}$. Similarly, it may be assumed that $F_2$ calculates optimal-config-range sets of $p_1$ and $p_3$ as $[p_1^{min,F2}, p_1^{max,F2}]$ and $[p_3^{min,F2}, p_3^{max,F2}]$ and the config-weight values of $p_1$ and $p_3$ on $o_2$ as $w_{o2,p1}$ and $w_{o2,p3}$. According to an embodiment, these config-weight values may be fixed unless the operator changes them manually.

According to this example, the system may start at time t=0 with some default values of these parameters $p_1^{def}$, $p_2^{def}$ and $p_3^{def}$ set by the operator, e.g., based on previous experience. At this instance, optimal-config-range set for $p_1$ is: $[p_1^{min,F1}, p_1^{max,F1}]$, p2 is: $[p_2^{min,F1}, p_2^{max,F1}]$ and $p_3$ is $[p_3^{min,F2}, p_3^{max,F2}]$. When the system starts operating, $F_1$ and $F_2$ begin to observe the environment and learn their outputs. As mentioned above, the CFs may periodically generate the values of optimal-config-range sets and config-weights. It may be assumed that in this CAN model, the value of periodicity is T. So, at time t=T, $F_1$ calculates the optimal-config-range sets for $p_1$ and $p_2$ and $F_2$ calculates the optimal-config-range sets for $p_1$ and $p_3$. The optimal-config-range sets generated by $F_1$ may be denoted as: $[p_1^{min,F1}{}_T, p_1^{max,F1}{}_T]$ and $[p_2^{min,F1}{}_T, p_2^{max,F1}{}_T]$ and F2 as: $[p_1^{min,F2}{}_T, p_1^{max,F2}{}_T]$ and $[p_3^{min,F2}{}_T, p_3^{max,F2}{}_T]$.

Now, for a configuration $p_i$, to check if the optimal-config-range sets of that parameter changed or not, a CF $F_i$ may execute the following operation:

$$(p_i^{min,Fi}{}_t == p_i^{min,Fi}{}_{t-T}) \text{ and } (p_i^{max,Fi}{}_t == p_i^{max,Fi}{}_{t-T}) \quad (1)$$

where t is the current instance and (t–T) is the previous time instance when the measurements were done. If the output of operation (1) is True, this means that the optimal-config-range set for $p_i$ has not changed. If it is False, this means the optimal-config-range set for $p_i$ has changed. The CF, $F_1$, may execute operation (1) for both $p_1$ and $p_3$. If the output is True in both cases, this would mean that for neither of them the optimal-config-range set has changed. In that case, $F_1$ may continue observing its output and does the same calculation again at t=2T. Similarly, $F_2$ may execute operation (1) for both $p_1$ and $p_3$. If the output is True in both cases, this would mean that for neither of them the optimal-config-range set has changed. In that case, $F_2$ may continue observing its output and does the same calculation again at t=2T.

In one example embodiment, to calculate the optimal configuration by the controller, it may be assumed that, when $F_1$ executed (1) for $p_1$, the result came as False. $F_1$ requests Controller to recalculate $p_1$. The controller asks the CFs in the system (in this case, $F_1$ and $F_2$) to send their optimal-config-range sets, utility functions and config-weights for $p_1$. $F_1$ sends: $\{[p_1^{min,F1}{}_T, p_1^{max,F1}{}_T], f_1(p_1)_T, w_{o1,p1}\}$ and $F_2$ sends: $\{[p_1^{min,F2}{}_T, p_1^{max,F2}{}_T], w_{o2,p1})_T, w_{o2,p1}\}$. As both $w_{o1,p1}$ and $w_{o2,p1}$ are greater than zero, the controller realizes both of them use $p_1$ and considers both of their optimal-config-range sets and utility functions in optimal $p_1$ calculation. The controller takes the minimum of $(p_1^{min,F1}{}_T, p_1^{min,F2}{}_T)$ and maximum of $(p_1^{max,F1}{}_T, p_1^{max,F2}{}_T)$. Within these two values, the controller may sample as many values as possible. For each sampled value s, the controller may calculate the following:

$$f_1(s)_T^{wo1,p1} f_2(s)_T^{wo2,p1}$$

For the particular value of s for which the product is maximum, according to the FMM game optimal allocation discussed above, is the optimal value of $p_1$ for the combined interest of $F_1$ and $F_2$. Although in this example the optimal value calculation for $p_1$ is explained, the same procedures may be followed to calculate any other configuration.

Figure 7A:
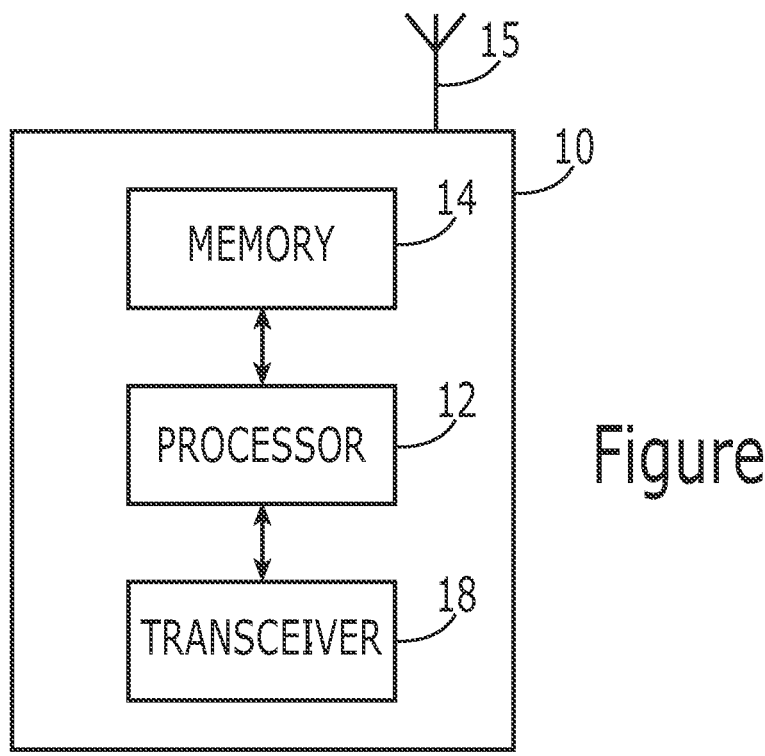
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network. For example, apparatus 10 may be a controller in a CAN, associated with a radio access network, such as a LTE network, 5G or NR.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 7a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a controller in a CAN, or the like. For example, in some embodiments, apparatus 10 may be configured to perform one or more of the processes depicted in any of the flow charts or signaling diagrams described herein, such as those illustrated in FIG. 4 or 5. For example, in certain embodiments, apparatus 10 may be configured to perform any of the procedures performed by the controller in FIG. 4 or 5, as discussed above. In some embodiments, as discussed herein, apparatus 10 may be configured to perform a procedure relating to determining optimal configurations in CAN.

According to this embodiment, apparatus 10 may be controlled by memory 14 and processor 12 to receive, from one or more CFs, information including an optimal configuration range set for the CF(s), a utility function generated by the CF(s), and/or a configuration weight representing a relative importance that an input configuration has on the output for the CF(s). In some embodiments, the value for the configuration weight may be set manually by network operator. In other embodiments, the value for the configuration weight may be set using a Shapley value calculation, as discussed in detail above.

Based on the received information, apparatus 10 may be controlled by memory 14 and processor 12 to determine or calculate an optimal value for configuration of a CAN. For example, the optimal value for the configuration is optimal for the combined interests of the CF(s). According to certain embodiments, apparatus 10 may be controlled by memory 14 and processor 12 to determine or calculate the optimal value for the configuration using a Fisher market game calculation, as discussed in detail above. In an embodiment, apparatus 10 may be controlled by memory 14 and processor 12 to use the optimal value for the configuration to reconfigure the CF(s) and/or to reconfigure the CAN.

In one embodiment, prior to receiving the information from the one or more CFs, apparatus 10 may be controlled by memory 14 and processor 12 to receive a request from the CF(s) to calculate or recalculate the configuration. After receiving the request, apparatus 10 may be controlled by memory 14 and processor 12 to transmit, to the CF(s), a request to provide the information.

Figure 7B:
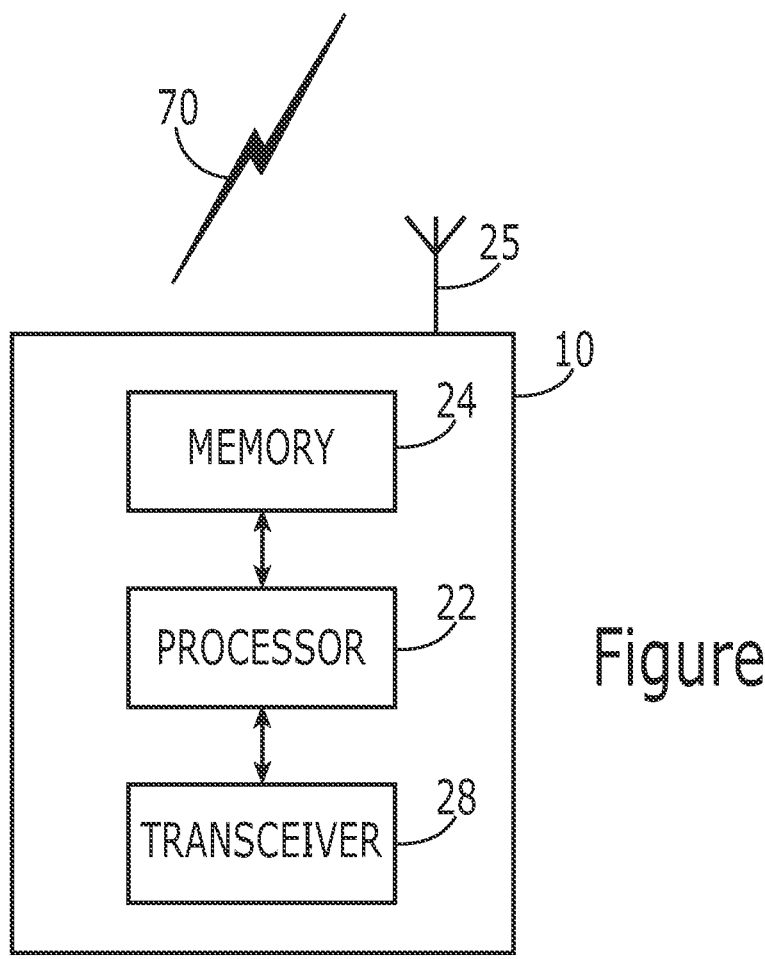
FIG. 7b illustrates an example block diagram of an apparatus, according to an embodiment.

FIG. 7b illustrates an example of an apparatus 20 according to another embodiment. In an embodiment, apparatus 20 may be a node or element in a communications network or associated with such a network, such as a LTE, 5G or NR system. In an embodiment, apparatus 20 may be or may represent a NAF or CF in a CAN, as discussed above.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 (or processing means) for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media, or other storage means. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 (or transceiving means) configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device) or input/output means.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a NAF or CF or learning agent, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 5 or 6. In certain embodiments, apparatus 20 may be configured to perform a procedure relating to determining and/or applying an optimal configuration in a CAN, for instance.

For example, in some embodiments, apparatus 20 may be controlled by memory 24 and processor 22 to observe its output and learning from the output. In an embodiment, after a certain time interval, apparatus 20 may be controlled by memory 24 and processor 22 to determine or calculate an optimal configuration range set for a configuration and to compare it with the optimal configuration range set calculated in a prior time interval. If it is determined by the comparison that the two optimal configuration range sets are identical, apparatus 20 is configured to continue its learning and wait for the next time interval. If it is determined by the comparison that the two optimal configuration range sets are not identical, then apparatus 20 may be controlled by memory 24 and processor 22 to detect a change in the optimal configuration range set and transmit a request to a controller to (re-)calculate the configuration for apparatus 20.

In an embodiment, apparatus 20 may be controlled by memory 24 and processor 22 to receive, from the controller, a request to provide information including the optimal configuration range set, a utility function, and configuration weight values. In certain embodiments, after receiving the request from the controller, apparatus 20 may be controlled by memory 24 and processor 22 to recalculate the corresponding utility function. According to an embodiment, the apparatus 20 may be preconfigured with the configuration weight values, e.g., via offline training using simulated or real life data. In one embodiment, apparatus 20 may then be controlled by memory 24 and processor 22 to send the latest optimal configuration range set, utility function, and configuration weight value to the controller.

According to certain embodiments, apparatus 20 may be controlled by memory 24 and processor 22 to receive an optimal configuration from the controller and to apply the optimal configuration received from the controller to perform network control actions.

Therefore, certain example embodiments provide several technological improvements, enhancements, and/or advantages over existing technological processes and constitute an improvement at least to the technological field of wireless network control and management. As discussed in detail above, certain embodiments provide systems and methods that enable dynamic determination of optimal configurations in a CAN based on information from a plurality of CFs or NAFs that may have differentiated interests in the particular configuration. In an embodiment, a controller is configured to take the individual interests of the various CFs/NAFs in that configuration, which it may combine to compute an appropriate allocation of rights to determine the value of the eventual configuration. As a result of example embodiments, the configuration can be effectively and dynamically determined among a plurality of CFs/NAFs. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:

receiving, by a controller of a 5G network apparatus, a request from at least two cognitive functions in a cognitive autonomous network (CAN) to calculate or recalculate a configuration weight;

transmitting, by the controller to the at least two cognitive functions, a request to provide information;

receiving, by the controller from the at least two cognitive functions, the information comprising a configuration range set for the at least two cognitive functions, a first utility function and a second utility function generated by the at least two cognitive functions, and the configuration weight representing a relative importance that an input configuration has on an output for the at least two cognitive functions, wherein a value for the configuration weight of each cognitive function of the at least two cognitive functions is set by:

determining a maximum output value for all pairs of any combination of input values of a plurality of input values of each cognitive function, performing a Shapley value calculation using the maximum output value for all pairs of any combination of input values of a plurality of input values of each cognitive function; and set the value of the configuration weight of each cognitive function based on a result of the Shapley value calculation;

based on the received information, calculating, by the controller, a first value for configuration of the cognitive autonomous network (CAN), wherein the first value for the configuration is based on meeting combined interests of the at least two cognitive functions, and a value for the configuration that provides a best possible compromise when taking into account interests of the at least two cognitive functions in the network, wherein the calculating comprises determining the first value for the configuration using a Fisher market game calculation of $f_1(s)_T^{wo1,p1}$, $f_2(s)_T^{wo2,p1}$, wherein:

an input value of the plurality of input values of the at least two cognitive functions is denoted by $p_1$, a first configuration weight of a first cognitive function of the at least two cognitive functions is denoted by $w_{o1,p1}$, a second configuration weight of a second cognitive function of the at least two cognitive functions is denoted by $w_{o2,p1}$, a value of periodicity is denoted by T, the first utility function of the first cognitive function of the at least two cognitive functions is denoted by $f_1(s)$, the second utility function of the second cognitive function of the at least two cognitive functions is denoted by $f_2(s)$, s is a sample value within the configuration range set for the at least two cognitive functions, and the first value is a value of s at which the Fisher market game calculation is maximum; and using the first value for the configuration to reconfigure the at least two cognitive functions and to reconfigure the CAN by updating the configuration range set using the first value, wherein the controller is configured to use the reconfigured CAN to perform functions associated with operation of the apparatus, which includes precoding of antenna gain/phase parameters, encoding of individual bits forming a communication message, decoding of individual bits forming a communication message, formatting of information, and processes related to management of communication resources.

* * * * *